(12) United States Patent
Defrank et al.

(10) Patent No.: US 11,950,545 B2
(45) Date of Patent: Apr. 9, 2024

(54) PRECISION IRRIGATION SYSTEM

(71) Applicant: Jain Irrigation Systems Limited, Maharashtra (IN)

(72) Inventors: Michael Patrick Defrank, Madera, CA (US); Ajit Bhavarlal Jain, Jalgaon (IN)

(73) Assignee: JAIN IRRIGATION SYSTEMS LIMITED, Maharashitra (IN)

( * ) Notice: Subject to any disclaimer, the term of this patent is extended or adjusted under 35 U.S.C. 154(b) by 570 days.

(21) Appl. No.: 16/496,764

(22) PCT Filed: Mar. 21, 2018

(86) PCT No.: PCT/IN2018/050159
§ 371 (c)(1),
(2) Date: Sep. 23, 2019

(87) PCT Pub. No.: WO2018/173072
PCT Pub. Date: Sep. 27, 2018

(65) Prior Publication Data
US 2020/0029517 A1    Jan. 30, 2020

(30) Foreign Application Priority Data

Mar. 21, 2017  (IN) .............................. 201721009879

(51) Int. Cl.
*A01G 25/16*   (2006.01)
*B64U 101/00*  (2023.01)
*B64U 101/40*  (2023.01)

(52) U.S. Cl.
CPC .......... *A01G 25/16* (2013.01); *B64U 2101/00* (2023.01); *B64U 2101/40* (2023.01)

(58) Field of Classification Search
CPC ................ A01G 25/16; B64C 2201/12; B64U 2101/00; B64U 2101/40
See application file for complete search history.

(56) References Cited

U.S. PATENT DOCUMENTS

| 10,084,868 B2 * | 9/2018 | Chandra | ................ G01C 11/02 |
| 10,660,279 B2 * | 5/2020 | Larsen | ................ G05B 19/048 |

(Continued)

OTHER PUBLICATIONS

International Search Report and Written Opinion issued in PCT/IN2018/050159, dated Sep. 25, 2018; ISA/US.

*Primary Examiner* — Peter M Poon
*Assistant Examiner* — Marisa V Conlon
(74) *Attorney, Agent, or Firm* — Harness, Dickey & Pierce, PLC

(57) ABSTRACT

System for precision irrigation is disclosed, the system comprises a main line. A plurality of sub main lines, wherein the plurality of sub main lines are configured to receive fluid from the main line. Further the system comprises a plurality of emitters lines emerging from at least one of the plurality of the sub main lines; wherein each emitter lines from the plurality lines has a length of at least 150 ft. A plurality of valves, wherein each valve is configured to connect at least one emitter line, from the plurality of emitter lines, with the at least one sub main line, from the plurality of sub main lines. The system further comprises a drone configured to communicably connect with the plurality of valves, wherein the drone is configured to receive a set of pre-defined instructions from a remote server and control the plurality of valves based on the instructions.

8 Claims, 2 Drawing Sheets

(56) References Cited

U.S. PATENT DOCUMENTS

| | | | |
|---|---|---|---|
| 10,728,336 B2* | 7/2020 | Akhtar | H04W 4/38 |
| 11,014,668 B2* | 5/2021 | Wu | A01G 25/16 |
| 2002/0002425 A1* | 1/2002 | Dossey | G01F 1/44 |
| | | | 700/282 |
| 2004/0117070 A1* | 6/2004 | Barker | A01G 25/16 |
| | | | 700/284 |
| 2006/0027677 A1* | 2/2006 | Abts | A01G 25/092 |
| | | | 239/69 |
| 2012/0254784 A1 | 10/2012 | Vander Griend et al. | |
| 2014/0129039 A1* | 5/2014 | Olive-Chahinian | A01G 25/16 |
| | | | 700/284 |
| 2015/0319941 A1 | 11/2015 | Klein et al. | |
| 2016/0100533 A1 | 4/2016 | Bauman et al. | |
| 2017/0020087 A1 | 1/2017 | Younis et al. | |
| 2017/0172077 A1* | 6/2017 | Wouhaybi | A01G 25/16 |

* cited by examiner

PRECISION IRRIGATION SYSTEM

CROSS REFERENCE TO RELATED APPLICATIONS

This application is a U.S. National Phase Application under 35 U.S.C. 371 of International Application No. PCT/IN2018/050159 filed on Mar. 21, 2018, which claims the benefit of priority from Indian Patent Application No. 201721009879 filed Mar. 21, 2017. The entire disclosures of all of the above applications are incorporated herein by reference.

TECHNICAL FIELD

The present disclosure described herein, in general, relates to a large-scale irrigation system more particularly to a precision large-scale irrigation using a drone to irrigate the field.

BACKGROUND

Presently, fields are being irrigated by common methods which distributes the fluid equally which is not cost efficient, the areas which has more requirement should be irrigated before the subsequent areas which have less requirement.

Further for large-scale irrigation, modern irrigation equipment's use radio signal to control to the valves. However, these irrigation equipment's require a radio sight in order to be in constant communication with a central controller.

SUMMARY

This summary is provided to introduce concepts related to irrigation systems using drone and the concepts are further described below in the detailed description. This summary is not intended to identify essential features of the claimed subject matter nor is it intended for use in determining or limiting the scope of the claimed subject matter.

This invention describes a precision irrigation system for linear irrigation lines commonly referred to as row or row crop applications. These systems have multiple parallel lines that irrigate the rows with the same flow rate and spacing for the entire block to be irrigated.

In an exemplary implementation of the present disclosure a system for precision irrigation is disclosed, the system comprises a main line. A plurality of sub main lines, wherein the plurality of sub main lines are configured to receive fluid from the main line. Further the system comprises a plurality of emitters lines emerging from at least one of the plurality of the sub main lines; wherein each emitter lines from the plurality lines has a length of at least 150 ft. A plurality of valves, wherein each valve is configured to connect at least one emitter line, from the plurality of emitter lines, with the at least one sub main line, from the plurality of sub main lines. The system further comprises a drone configured to communicably connect with the plurality of valves, wherein the drone is configured to receive a set of pre-defined instructions from a remote server and control the plurality of valves based on the instructions.

DETAILED DESCRIPTION

The present subject matter discloses a precision irrigation system for linear irrigation lines commonly referred to as row or row crop applications. The below description discloses an exemplary embodiment of the subject matter. According to the exemplary embodiment irrigation system may comprise a valve that is inserted into the main line of the individual row, these valves either has a small solar cell similar to one manufactured by Sol Chip or a piezoelectric device, wherein they have a receiving circuit attached to them.

The segments described above have a valve that is inserted into the main line of the individual row and forms a secondary shorter parallel line to the main line of the individual row. These valve assemblies either a small solar cell similar to one manufactured by Sol Chip or a piezoelectric device with a blocking valve for the correct action. These devices generate enough power to activate a small valve.

The secondary segment may be spaced at 150 ft between each of the secondary segment. The secondary segment may further comprise a row of emitters appropriately spaced and serviced by these valves on each individual segment. These valves are on off valves. They have a receiving circuit attached to them that is activated by a signal from the drone. The field requirements are determined by mapping the field for a number of requirements. There may be several maps for water absorption, nitrogen requirements or other plant requirements. Each series of flyovers and activation by the drone can be changed by simply changing the pattern in the drone. There would be a series of flyover/activation for each pattern requirement. The first flyover/activation would activate the highest requirement and have a specific time for that activation. The next activation would be the next highest requirement for the appropriate time and then so on until the entire field is satisfied. An entirely different set of activation patterns could be programmed for different requirements (different maps) for nitrogen or other plant needs. The pattern and signal activation can be programmed into the drone based on GPS location.

In yet another embodiment the present disclosure discloses a method for precise irrigation. The method may comprise steps of mapping a plurality of valves using a global positioning system. Further automatically assigning a unique value to the plurality of valves and controlling the plurality of valves by a drone.

Figure 1:
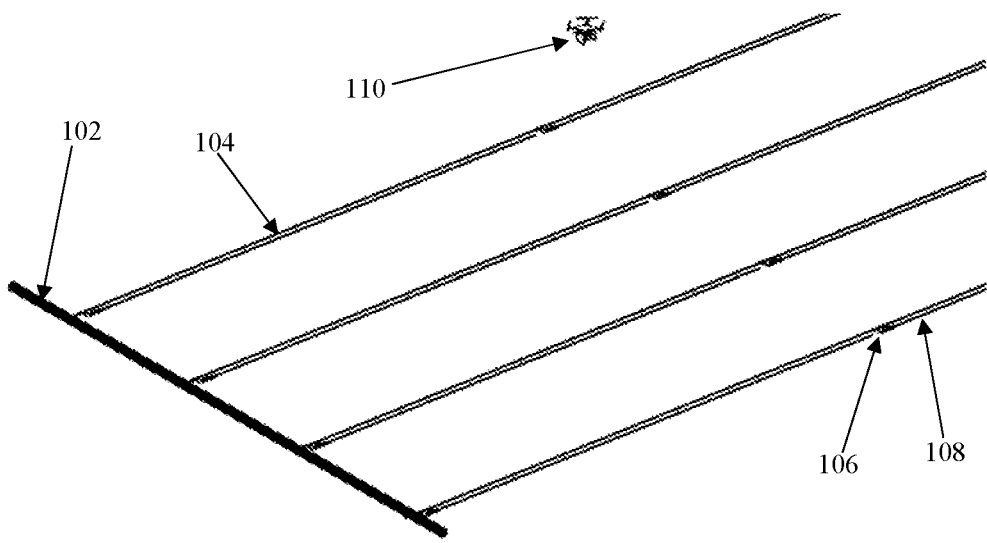
FIG. 1 illustrates a common line irrigation system with sub main irrigation line and emitter line, in accordance with the present disclosure.

Referring to FIG. 1, illustrates a common line irrigation system with sub main irrigation line and emitter line, in accordance with the present disclosure. According, to the exemplary embodiment the irrigation system may comprise a main line 102. Further the main line 102 may branch into a plurality of sub main line 104. The main line 102 and sub main line 104 may be configured to hold and provide continues fluid for irrigation. Further each sub line 104 from the plurality sub main line 104 may further be split into a plurality of emitter lines 108. Further each emitter line 108 from the plurality of emitter lines 108 may be connected to the sub main line 104 via a valve 106. In accordance with the present exemplary embodiment the valve 106 may be activated and de-activated using a drone 110, wherein the drone 110 may be pre-programed with a schedule to do the same.

In yet another embodiment of the present disclosure the main line 102 may be connected to the plurality of sub main lines 104. The plurality of sub main lines may further be configured to receive fluid or other nutrients from the main line 102. Further a plurality of emitters lines 108 may emerge from the at least one of the plurality of the sub main lines. Each emitter lines from the plurality lines 108 may have a length of at least 150 ft. The main lines, the plurality of sub main lines, and the plurality of emitter lines form a liner topology for irrigation area Further the embodiment may comprise of a plurality of valves 106. Each valve can be configured to connect with at least one emitter line, from the plurality of emitter lines 108, with the at least one sub main line, from the plurality of sub main lines 104. The plurality of valves 106 may further be communicably connected to a drone 110. The plurality of valves 108 may comprise a solar panel to generate power on-board, in order to supply power to a piezoelectric device or solenoid actuators to control opening of the plurality of valves by the drone 110.

The drone 110 may be configured to receive a set of pre-defined instructions from a remote server (Not shown) and control the plurality of valves 108 based on the instructions. The set of pre-defined instructions may comprise task associated with the drone 108. The task can be performed dynamically based on priority setting. Further the set of pre-defined instructions could be stored on board the drone 110 or communicated dynamically to the drone 110 via a communication channel from the remote server.

Figure 2:
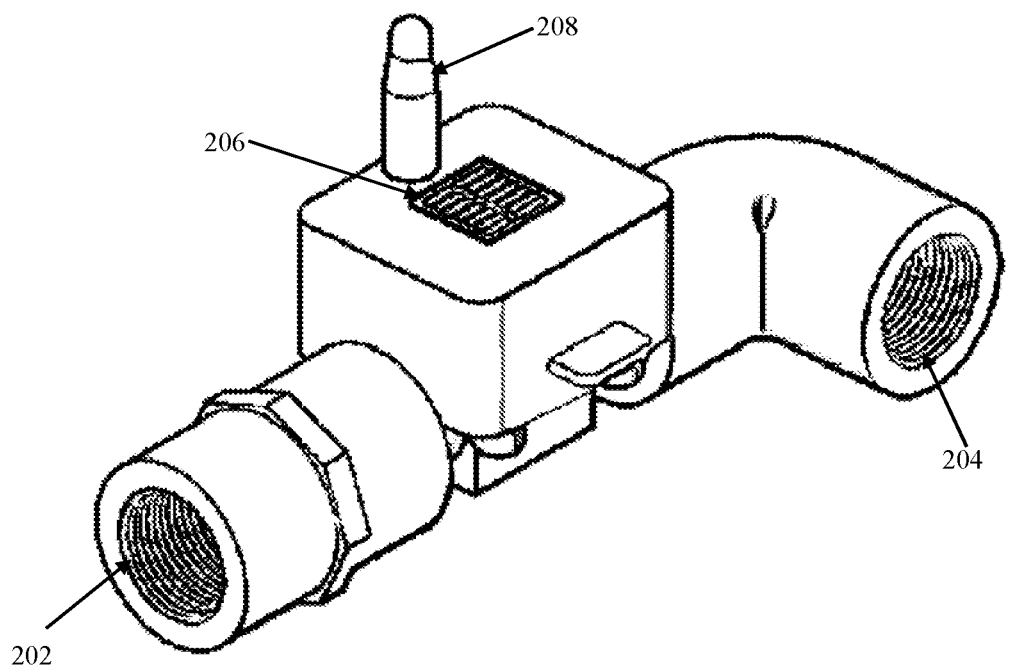
FIG. 2, illustrates a valve in accordance with an exemplary embodiment of the present disclosure.

FIG. 2, illustrates a valve in accordance with an exemplary embodiment of the present disclosure. The valve 200 may be configured to operate in only on or off state and may comprise a first opening 202 and a second opening 204. Either the first opening 202 or the second opening 204 may be connected with a sub main line in row irrigation system. Subsequently the remaining opening would provide the fluid to an emitter line. The valve 200 may further comprise a solar panel 206. The solar panel 206 may be mounted directly onto the valve to provide power to the valve 200. Further the valve 200, may have a solenoid switch 208. The valve may be operated into or toggled between On mode and Off mode via a piezoelectric device or solenoid actuators. These may in turn be activated or de-activated by a drone. The drone may be configured or pre-programed to survey a section of a field to be irrigated and based on pre-defined parameters actuate various valves in the irrigation system real-time and without the need of line of sight for radio signal communications. Further each of the plurality of valves 200 are mapped using a global positing system, with each of the plurality of valves having a unique location.

We claim:

1. A system for precision irrigation for an irrigation area, the system comprising:
a main line;
a plurality of sub main lines, wherein the plurality of sub main lines are configured to receive fluid from the main line;
a plurality of emitters lines emerging from at least one of the plurality of the sub main lines;
a plurality of valves, wherein each valve is configured to connect with at least one emitter line, from the plurality of emitter lines, with the at least one sub main line, from the plurality of sub main lines; and
a drone configured to communicably connect with the plurality of valves;
a remote server being a controller communicably connected with the drone, wherein the remote server sends a set of pre-defined instructions to the drone for a set of activation patterns and the drone automatically controls the plurality of valves in real-time based on the set of pre-defined instructions received from the remote server;
wherein each valve comprises:
a receiving circuit for receiving an activation signal from the drone and
at least one of a piezoelectric device and a solenoid actuator configured to receive the activation signal from the receiving circuit and control at least one opening of each valve based on the activation signal, and
a solar panel mounted directly onto each valve to generate on-board power;
wherein the drone is further configured to dynamically execute the set of pre-defined instructions for the set of activation patterns based on a plurality of irrigation requirements, a GPS location of the irrigation area, and a location of at least one of the valves, wherein each activation pattern comprises a series of flyovers over the irrigation area and supply of activation signals to the receiving circuit of at least one valve of the plurality of valves for a pre-set time by the drone, the location of each of the plurality of valves in the irrigation area is mapped using a global positioning system,
the remote server is configured to automatically assign a unique value for each of the plurality of valves in the irrigation area based on the location of each valve and control the plurality of valves by using the drone based on the unique value of each of the plurality of valves;
wherein each series of flyovers and each activation comprises:
a first flyover that activates the valve having the highest priority irrigation requirement for a first time,
a second flyover that activates the valve having the next highest priority irrigation requirement for a second time, and
further flyovers activating the further valves of the plurality of valves until the entire irrigation area meets the plurality of irrigation requirements,
each series of flyovers and each activation by the drone is changed by changing the activation pattern in the drone, wherein the drone is configured to automatically execute different sets of activation patterns for different requirements of the plurality of valves.

2. The system as claimed in claim 1, wherein the drone is further configured to dynamically execute the set of pre-defined instructions for the set of activation patterns based on a priority relating to the plurality of irrigation requirements.

3. The system as claimed in claim 1, wherein the drone is configured to store the set of pre-defined instructions on board the drone.

4. The system as claimed in claim 1, wherein the drone is configured to receive the set of pre-defined instructions dynamically via a communication channel from the remote server.

5. The system as claimed in claim 1, wherein the main line, the plurality of sub main lines, and the plurality of emitter lines form a liner topology for the irrigation area.

6. The system as claimed in claim 1, wherein the plurality of irrigation requirements of the irrigation area comprises at least one of water absorption, nitrogen requirements and plant requirements.

7. The system as claimed in claim 1, wherein the drone is pre-programmed with the set of pre-defined instructions for the set of activation patterns and to control the plurality of valves based on the plurality of irrigation requirements and the location of the at least one valve.

8. The system as claimed in claim 1, wherein each valve is configured to operate into On mode and Off mode via the at least one of the piezoelectric device and the solenoid actuator.

\* \* \* \* \*